United States Patent
Sun et al.

(10) Patent No.: US 8,301,522 B2
(45) Date of Patent: Oct. 30, 2012

(54) METHOD, DEVICE AND SYSTEM FOR CONFIGURATION AND QUOTATION PROCESSING

(75) Inventors: Yongfang Sun, Shenzhen (CN); Liangcheng Shan, Shenzhen (CN); Siyi Zhou, Shenzhen (CN); Jiwei Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 12/692,256

(22) Filed: Jan. 22, 2010

(65) Prior Publication Data

US 2010/0191673 A1    Jul. 29, 2010

(30) Foreign Application Priority Data

Jan. 24, 2009 (CN) .......................... 2009 1 0077614

(51) Int. Cl.
*G06Q 99/00* (2006.01)
(52) U.S. Cl. ........ 705/34; 705/7.35; 705/26.1; 705/400; 700/900
(58) Field of Classification Search ................. 705/7.31, 705/7.35, 26.81, 27.1, 30, 400
See application file for complete search history.

(56) References Cited

U.S. PATENT DOCUMENTS

| 7,006,988 | B2 * | 2/2006 | Lin et al. ................. 705/26.81 |
| 7,188,075 | B1 * | 3/2007 | Smirnov ................... 705/7.35 |
| 7,392,255 | B1 * | 6/2008 | Sholtis et al. .................. 1/1 |
| 2002/0052807 | A1 * | 5/2002 | Han et al. ...................... 705/27 |
| 2004/0243794 | A1 | 12/2004 | Mackin et al. |
| 2006/0287932 | A1 * | 12/2006 | Wulteputte et al. ........... 705/27 |
| 2009/0276270 | A1 * | 11/2009 | Karnataka ........................ 705/8 |

FOREIGN PATENT DOCUMENTS

| CN | 1455610 A | 11/2006 |
| CN | 101101651 A | 1/2008 |
| CN | 101271475 A | 9/2008 |

OTHER PUBLICATIONS

Vijayan, Jaikumar, "The Data Builds the Products", Feb. 24, 2003; Computerworld; pp. 32 and 43.*
Spera, Jason, "Untangling the Web of Collaboration", Jan. 2001, Circuits Assembly; ProQuest Computing, p. 98.*
Teschler, Leland, "New IMAN release excels at BOM-to-BOM comparisons", Nov. 21, 1996; Machine Design; p. 82.*

* cited by examiner

*Primary Examiner* — John Hayes
*Assistant Examiner* — Freda A Nelson
(74) *Attorney, Agent, or Firm* — Leydig, Voit & Mayer, Ltd.

(57) ABSTRACT

A configuration and quotation processing method and system, a configuration and quotation device, and a configuration conversion device are provided. The method includes: acquiring a sales bill of material (SBOM) configuration rule of a product; calculating a configuration bill of material (BOM) of the product according to the SBOM configuration rule, a product price, and received quotation configuration parameters; filtering the configuration BOM according to a preset output content and structure rule to generate an SBOM of the product; and converting the SBOM into a base bill of material (BBOM) according to an SBOM to BBOM (S2B) conversion rule. As such, a client-oriented SBOM can be automatically generated, thereby ensuring the accuracy of the SBOM, and improving the work efficiency.

13 Claims, 12 Drawing Sheets

METHOD, DEVICE AND SYSTEM FOR CONFIGURATION AND QUOTATION PROCESSING

CROSS-REFERENCE TO RELATED APPLICATION

This application claims priority to Chinese Patent Application No. 200910077614.9, filed Jan. 24, 2009, which is hereby incorporated by reference in its entirety.

FIELD OF THE INVENTION

The present invention relates to a product configuration and quotation technology, and more particularly to a configuration and quotation processing method and system, a configuration and quotation device, and a configuration conversion device.

BACKGROUND

With the integration of more functions, the configuration of various products such as communication products gradually becomes complex. In the sales process, a configuration and quotation system needs to perform configuration and quotation on a product that a user needs so as to generate a configuration bill of material (BOM), and transmit the configuration BOM to an order processing system for production and delivery. Currently, the configuration and quotation system is a manual or semi-manual system, and generally uses the EXCEL software as a tool. FIG. 1 is a schematic structural view of a configuration and quotation system in the conventional art. The configuration and quotation system is based on manual operation, and generates a product configuration and quotation template, as shown by an EXCEL spreadsheet in FIG. 1, in the EXCEL software by using an EXCEL formula or macro in advance. Quotation configuration parameters are manually input into the product configuration and quotation template to generate a client-oriented sales bill of material (SBOM), that is, a quotation, and the quotation is provided to the client; meanwhile, the SBOM is manually translated to generate a production-oriented base bill of material (BBOM), and the BBOM is entered into an order processing system.

During the implementation of the present invention, the inventor found that, at least the following problems exist when the configuration and quotation system in the conventional art is used for product configuration and quotation.

Since the client-oriented SBOM and the production-oriented BBOM are generated based on the same configuration and quotation template, the configuration and quotation template needs to contain comprehensive and detailed configuration information. Since the configuration BOM is generated according to configuration parameters based on the configuration and quotation template, it is necessary to manually delete data such as a configuration instruction in the configuration BOM that does not need to be provided to the client, so as to generate a BOM to be submitted to the client. At this time, an error easily occurs due to improper deletion, and the work efficiency is rather low.

SUMMARY

Accordingly, the present invention is directed to a configuration and quotation processing method and system, a configuration and quotation device, and a configuration conversion device, so as to improve the accuracy of the SBOM, and the work efficiency.

In an embodiment, the present invention provides a configuration and quotation processing method, which includes: acquiring an SBOM configuration rule of a product; calculating a configuration BOM of the product according to the SBOM configuration rule, a product price, and received quotation configuration parameters; filtering the configuration BOM according to a preset output content and structure rule to generate an SBOM of the product; and converting the SBOM into a BBOM according to an SBOM to BBOM (S2B) conversion rule.

In an embodiment, the present invention provides a configuration and quotation processing system, which includes a configuration and quotation device and a configuration conversion device.

The configuration and quotation device is adapted to acquire an SBOM configuration rule and a product price of a product, and receive quotation configuration parameters; calculate a configuration BOM of the product according to the SBOM configuration rule, the product price, and the quotation configuration parameters; and filter the configuration BOM according to a preset output content and structure rule to generate an SBOM of the product.

The configuration conversion device is adapted to convert the SBOM into a BBOM of the product according to an S2B conversion rule.

The configuration and quotation processing method and system according to the above embodiments of the present invention can calculate the configuration BOM of the product according to the SBOM configuration rule and the product price of the product as well as the received quotation configuration parameters, automatically filter the calculated configuration BOM according to the preset output content and structure rule to generate the client-oriented SBOM, and automatically convert the SBOM provided to the client into the BBOM of the product for production according to the S2B conversion rule. As such, it is unnecessary to manually delete data such as a configuration instruction in the configuration BOM that does not need to be provided to the client, and the SBOM provided to the client does not need to be manually converted into the BBOM of the product. Compared with the conventional art, errors caused by manual deletion or manual conversion are avoided, thereby ensuring the accuracy of the SBOM and the BBOM, and improving the work efficiency of the product configuration and quotation process.

In an embodiment, the present invention provides a configuration and quotation device, which includes a second acquisition module, a calculation module, a generation module, and a second output module.

The second acquisition module is adapted to acquire an SBOM configuration rule and a product price of a product, and receive quotation configuration parameters.

The calculation module is adapted to calculate a configuration BOM of the product according to the SBOM configuration rule, the product price, and the quotation configuration parameters.

The generation module is adapted to filter the configuration BOM according to a preset output content and structure rule to generate an SBOM of the product.

The second output module is adapted to output the SBOM.

The configuration and quotation device according to the above embodiment of the present invention can calculate the configuration BOM of the product according to the SBOM configuration rule and the product price of the product as well as the received quotation configuration parameters, and automatically filter the calculated configuration BOM according to the preset output content and structure rule to generate the client-oriented SBOM. As such, it is unnecessary to manually delete data such as a configuration instruction in the configuration BOM that does not need to be provided to the client. Compared with the conventional art, errors caused by manual deletion are avoided, thereby ensuring the accuracy of the SBOM, and improving the work efficiency.

In an embodiment, the present invention provides a configuration conversion device, which includes a third acquisition module, a conversion module, and a third output module.

The third acquisition module is adapted to receive an SBOM of a product, and acquire an S2B conversion rule.

The conversion module is adapted to convert the SBOM into a BBOM of the product according to the SBOM and the S2B conversion rule.

The third output module is adapted to output the BBOM.

The configuration conversion device according to the above embodiment of the present invention can automatically convert the SBOM provided to the client into the BBOM of the product for production according to the S2B conversion rule. As such, the SBOM provided to the client does not need to be manually converted into the BBOM of the product. Compared with the conventional art, errors caused by manual conversion are avoided, thereby ensuring the accuracy of the BBOM, and improving the work efficiency of the product configuration and quotation process.

In an embodiment, the present invention provides a data development device, which includes a receiving module, a setting module, a first acquisition module, and a first output module.

The receiving module is adapted to receive a structure and configuration parameters of a product.

The setting module is adapted to set an SBOM configuration rule and a BBOM configuration rule of the product according to the structure and the configuration parameters of the product.

The first acquisition module is adapted to acquire an S2B conversion rule according to the SBOM configuration rule and the BBOM configuration rule.

The first output module is adapted to output the SBOM configuration rule, the BBOM configuration rule, and the S2B conversion rule.

The data development device according to the above embodiment of the present invention can develop the SBOM configuration rule and the BBOM configuration rule of the product according to the structure and the configuration parameters of the product, and acquire the S2B conversion rule, such that an SBOM and a BBOM of the product can be automatically generated according to the SBOM configuration rule, the BBOM configuration rule, and the S2B conversion rule in subsequent operations.

In an embodiment, the present invention provides a data center, which includes a first storage module, a second storage module, and a maintenance module.

The first storage module is adapted to store a product price, an SBOM configuration rule, a BBOM configuration rule, and an S2B conversion rule at a corresponding storage position according to a product identifier (ID).

The second storage module is adapted to store the product ID, and a maintainer ID and a password authorized to maintain and update the SBOM configuration rule, the BBOM configuration rule, and the S2B conversion rule corresponding to the product ID.

The maintenance module is adapted to receive a request message containing a maintainer ID and a password sent by a maintainer, authenticate the maintainer ID and the password in the request message according to the maintainer ID and the password stored in the second storage module, and authorize the maintainer to maintain and update the SBOM configuration rule, the BBOM configuration rule, and the S2B conversion rule stored in the first storage module if the maintainer ID and the password in the request message pass the authentication.

The data center according to the above embodiment of the present invention can take a product as a unit to implement centralized storage, management, maintenance, and updating of the SBOM configuration rule, the BBOM configuration rule, and the S2B conversion rule of the product in accordance with the dynamic change of the product, such that the latest SBOM and BBOM can be generated according to the SBOM configuration rule, the BBOM configuration rule, and the S2B conversion rule in subsequent operations.

The technical solution of the present invention is further described in detail below with reference to embodiments and the accompanying drawings.

BRIEF DESCRIPTION OF THE DRAWINGS

To illustrate the technical solution according to the embodiments of the present invention or in the conventional art more clearly, the accompanying drawings required for describing the embodiments or the conventional art are introduced below briefly. Apparently, the accompanying drawings in the following descriptions merely show some of the embodiments of the present invention, and persons of ordinary skill in the art can obtain other drawings according to the accompanying drawings without creative efforts.

FIG. 4-*b* shows a structure of the product A in a BBOM according to the embodiment of the present invention;

FIG. 4-*c* shows product configuration parameters of the product A according to an embodiment of the present invention;

DETAILED DESCRIPTION OF EMBODIMENTS

The technical solution of the present invention will be clearly and fully described below with reference to the accompanying drawings. It is obvious that the embodiments to be described are only a part rather than all of the embodiments of the present invention. All other embodiments derived by persons skilled in the art based on the embodiments of the present invention without creative efforts should fall within the protection scope of the present invention.

In the present invention, a client-oriented SBOM can be automatically generated according to a SBOM configuration rule, a product price, and received quotation configuration parameters, thereby ensuring the accuracy of the SBOM, and improving the work efficiency of the product configuration and quotation process.

Figure 2:
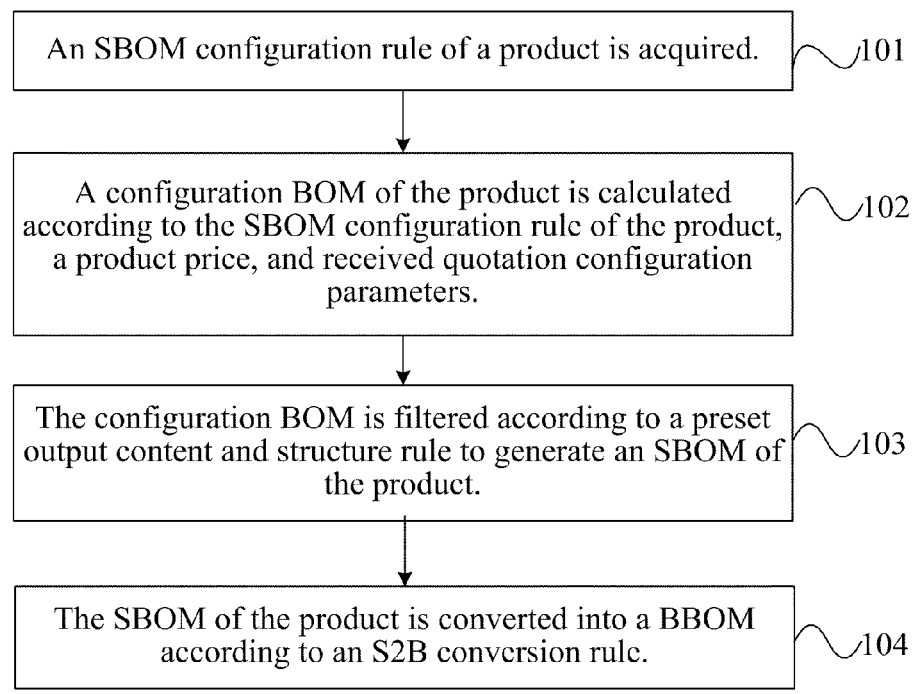
FIG. 2 is a flow chart of a configuration and quotation processing method according to an embodiment of the present invention.

FIG. 2 is a flow chart of a configuration and quotation processing method according to an embodiment of the present invention. Referring to FIG. 2, the method includes the following steps.

In Step 101, an SBOM configuration rule of a product is acquired.

In Step 102, a configuration BOM of the product is calculated according to the SBOM configuration rule, a product price, and received quotation configuration parameters.

In Step 103, the configuration BOM is filtered according to a preset output content and structure rule to generate an SBOM of the product. The SBOM is just a quotation.

In Step 104, the SBOM of the product is converted into a BBOM according to an S2B conversion rule.

In this embodiment, the calculated configuration BOM is automatically filtered according to the preset output content and structure rule to generate the client-oriented SBOM, and the SBOM provided to the client is automatically converted into the BBOM of the product for production according to the S2B conversion rule. As such, a user neither needs to manually delete data in the configuration BOM that does not need to be provided to the client, nor needs to manually convert the SBOM provided to the client into the BBOM of the product. Therefore, errors caused by manual deletion or manual conversion are avoided, thereby ensuring the accuracy of the SBOM and the BBOM, and improving the work efficiency of the product configuration and quotation process.

Figure 3:
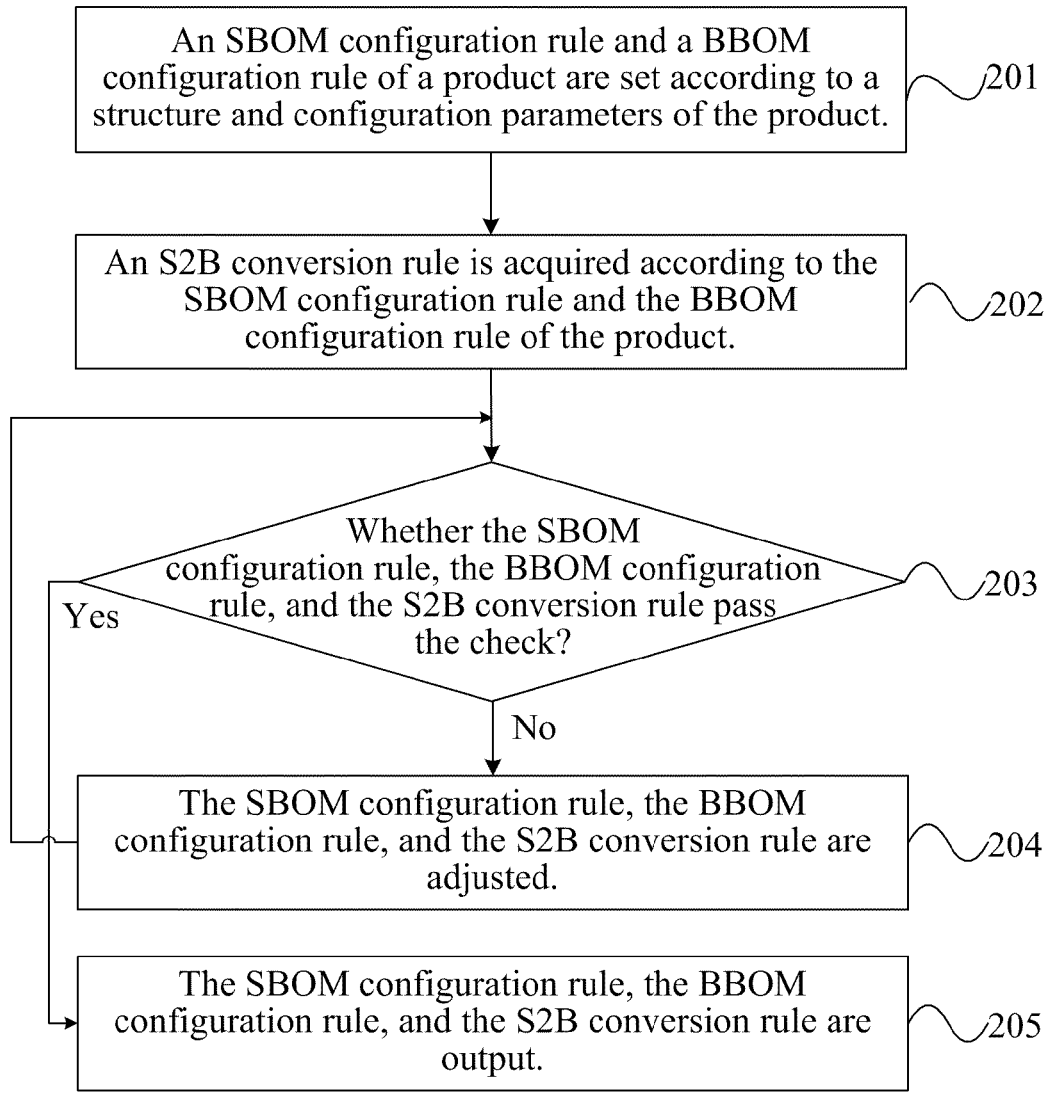
FIG. 3 is a flow chart of a process for setting SBOM and BBOM configuration rules and acquiring an S2B conversion rule according to an embodiment of the present invention.

FIG. 3 is a flow chart of a process for setting SBOM and BBOM configuration rules and acquiring an S2B conversion rule according to an embodiment of the present invention. Referring to FIG. 3, the process includes the following steps.

In Step 201, an SBOM configuration rule and a BBOM configuration rule of a product are set according to a structure and configuration parameters of the product.

In Step 202, an S2B conversion rule is acquired according to the SBOM configuration rule and the BBOM configuration rule of the product.

Specifically, the SBOM configuration rule, the BBOM configuration rule, and the S2B conversion rule may be expressed by an open-source scripting language Python, which can express complex configuration algorithms and rules, and provide an effective check and constraint mechanism as compared with the existing EXCEL tool.

Figures 4A, 4B, 4C:
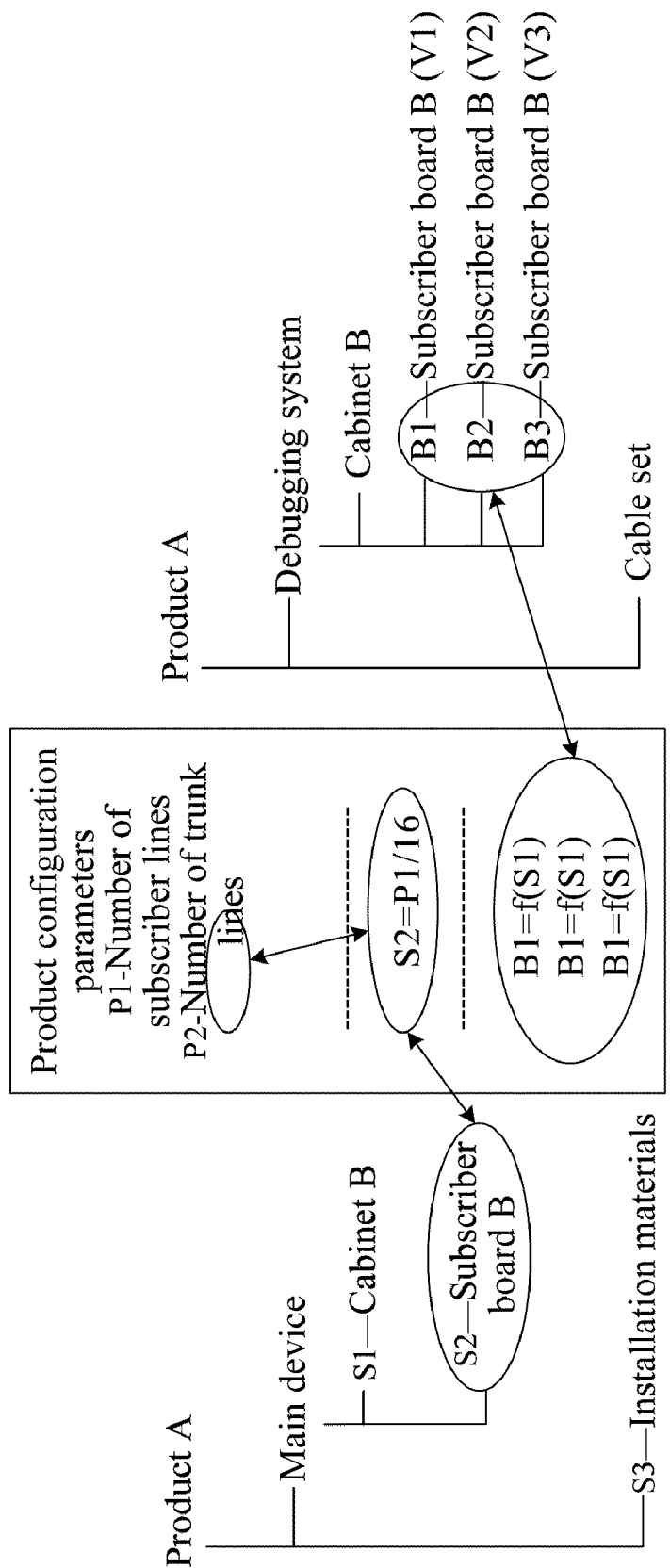
FIG. 4-*a* shows a structure of a product A in an SBOM according to the embodiment of the present invention.

For example, a product A is defined as follows. FIG. 4-*a* shows a structure of a product A in an SBOM according to the embodiment of the present invention. Referring to FIG. 4-*a*, the product A includes a main device and installation materials (with a parameter code of S3), and the main device includes a cabinet B (with a parameter code of S1) and a subscriber board B (with a parameter code of S2). FIG. 4-*b* shows a structure of the product A in a BBOM according to the embodiment of the present invention. Referring to FIG. 4-*b*, the product A includes a debugging system and a cable set, and the debugging system includes a cabinet B, a subscriber board B (V1) (with a parameter code of B1), a subscriber board B (V2) (with a parameter code of B2), and a subscriber board B (V3) (with a parameter code of B3). FIG. 4-*c* shows product configuration parameters of the product A according to an embodiment of the present invention. Referring to FIG. 4-*c*, the number of subscriber lines is represented by a parameter code P1, it is assumed that the number of subscriber lines is constrained by a parameter check and constraint rule, the number of trunk lines is represented by a parameter code P2, and it is assumed that the number of trunk lines is also constrained by the parameter check and constraint rule. S2 may be expressed by the open-source scripting language Python as follows: S2=P1/16, and a configured number of S2 may be calculated according to the parameter P1. According to the above configuration rule, the S2B conversion rule may be expressed as follows: B1=f1(S2), B2=f2(S2), and B3=f3(S2). Configured numbers of B1, B2, and B3 may be calculated according to functions f1, f2, and f3 of the configured number of S2, for example, B1=S2 or B1=S2/4, B2=S2/4, and B3=S2/2.

Specifically, quotation configuration parameters input by a user may be normalized into one-dimensional parameters, that is, the quotation configuration parameters input by a user may be expressed by using parameter codes, descriptions, and values. Table 1 shows an example for expressing quotation configuration parameters.

TABLE 1

Example for Expressing Quotation Configuration Parameters

| Parameter Code | Description | Value |
|---|---|---|
| P0001 | Number of Subscriber Lines | 128 |
| P0002 | BBBB | XX |

According to the Table 1, a quotation configuration parameter input by a user has a parameter code of P0001, is described as the number of subscriber lines, and has a value of 128.

The production-oriented BBOM configuration rule and the client-oriented SBOM configuration rule are separately set, and the SBOM and the BBOM are separately calculated. Compared with the conventional art, when the materials are replaced, the SBOM configuration rule and the BBOM configuration rule do not need to be modified, thereby reducing the workload resulting therefrom.

In Step 203, the SBOM configuration rule, the BBOM configuration rule, and the S2B conversion rule are checked according to a preset parameter check and constraint rule, and it is determined whether the SBOM configuration rule, the BBOM configuration rule, and the S2B conversion rule pass the check. If not all of the SBOM configuration rule, the BBOM configuration rule, and the S2B conversion rule pass the check, Step 204 is performed; and if all of the SBOM configuration rule, the BBOM configuration rule, and the S2B conversion rule pass the check, Step 205 is performed.

For example, the parameter check and constraint rule may define that the number of subscriber lines of the product has an upper limit of 1024. The parameter check and constraint rule may prevent the configured number of the subscriber board B from exceeding a maximum capacity of the product in the configuration and quotation process. If the number of subscriber lines input is too large, the SBOM configuration rule, the BBOM configuration rule, and the S2B conversion rule may be adjusted, or an error indication message may be returned.

The open-source scripting language Python can support arithmetic and logical operations, and meet the requirement for expressing the configuration calculation and the parameter check and constraint rule by providing a variety of rule expressions. For example, a configuration rule for calculating S2 may be expressed as follows.

```
IF   P0001>1024   THEN
Show "The configured number exceeds the maximum capacity
of the product";
ELSE
S2=P0001/16; calculate the configured number of S2.
END
```

In Step 204, the SBOM configuration rule, the BBOM configuration rule, and the S2B conversion rule are adjusted, and the process returns to Step 203.

The SBOM configuration rule, the BBOM configuration rule, and the S2B conversion rule can be automatically constrained and checked according to the preset parameter check and constraint rule, and the accuracy of the rules can be ensured without any manual operation, thereby saving the human resources. Moreover, when the SBOM configuration rule, the BBOM configuration rule, and the S2B conversion rule fail to pass the check, corresponding adjustment is performed, thereby improving the accuracy of the SBOM configuration rule, the BBOM configuration rule, and the S2B conversion rule.

In Step 205, the SBOM configuration rule, the BBOM configuration rule, and the S2B conversion rule are output.

Specifically, the SBOM configuration rule, the BBOM configuration rule, and the S2B conversion rule may be output for direct use. The SBOM configuration rule, the BBOM configuration rule, and the S2B conversion rule may also be output to a data center, stored at a storage position in the data center corresponding to a product ID adapted to identify the product, or further issued in the data center. In addition, a product price may also be received and stored at the position corresponding to the product ID for subsequent use, so as to facilitate the centralized management, maintenance, and updating of the SBOM configuration rule, the BBOM configuration rule, the S2B conversion rule, and the product price of the product, and meet the requirements of changes in the SBOM configuration rule and the BBOM configuration rule in accordance with the dynamic development of the product, thereby achieving effective sharing, querying, and statistical analysis of the SBOM configuration rule, the BBOM configuration rule, and the S2B conversion rule of the product.

Figure 1:
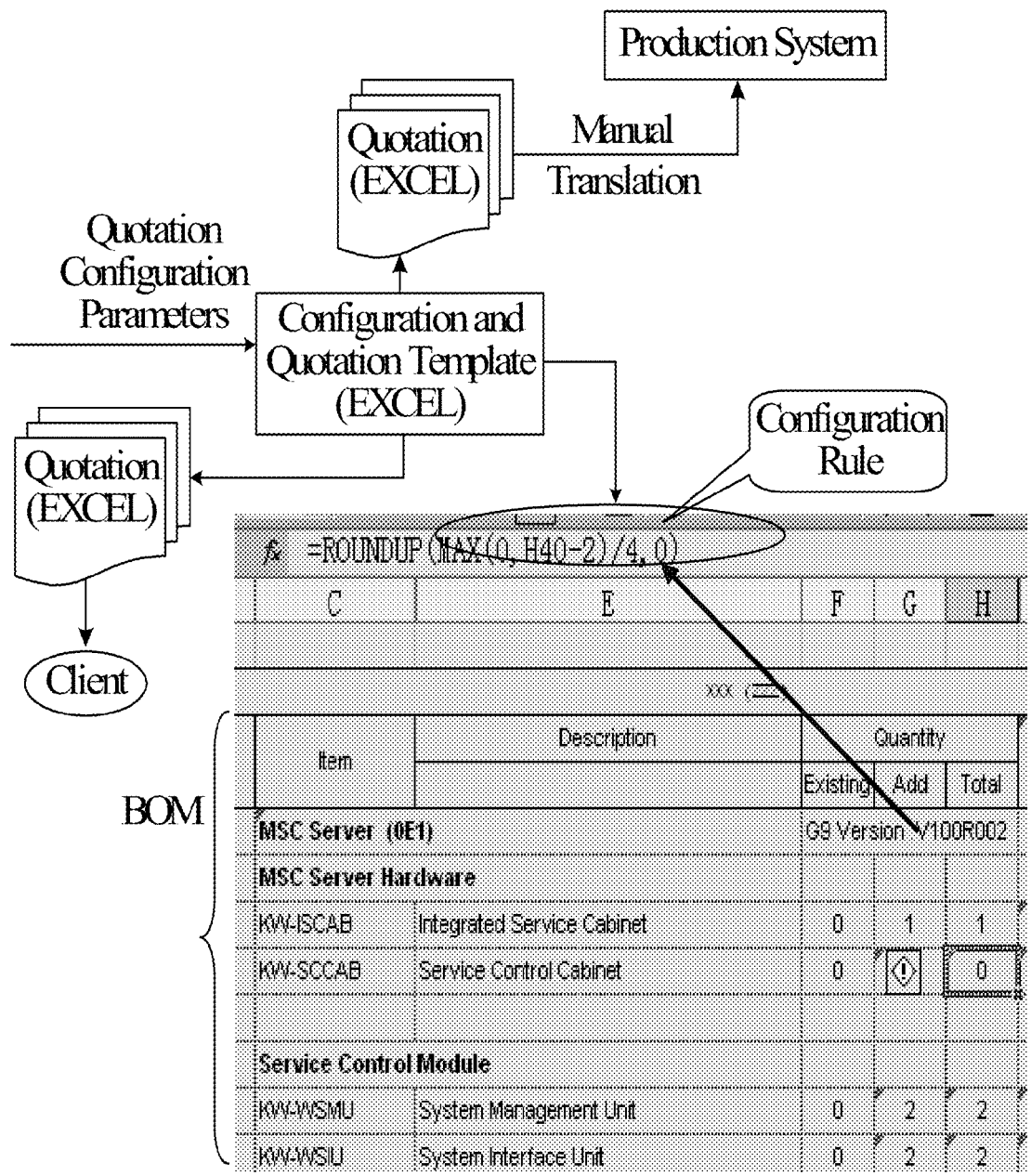
FIG. 1 is a schematic structural view of a configuration and quotation system in the conventional art.

Correspondingly, in the embodiment as shown in FIG. 1, the SBOM configuration rule and the S2B conversion rule output in the Step 205 may be directly received, or the pre-stored SBOM configuration rule and S2B conversion rule may be acquired from the data center according to the product ID. In the embodiment as shown in FIG. 1, a product price input by the user may be directly received, or the pre-stored product price may be acquired from the data center according to the product ID.

After the SBOM configuration rule, the BBOM configuration rule, and the S2B conversion rule output in the Step 205 are stored in the data center, a corresponding maintainer may be authorized to maintain and update the SBOM configuration rule, the BBOM configuration rule, and the acquired S2B conversion rule, according to a preset distribution structure for maintaining the product information. For example, a maintainer with a maintainer ID of 0001 is authorized to maintain and update a product with a product ID of 0001, and a maintainer with a maintainer ID of 0002 is authorized to maintain and update a product with a product ID of 0002.

Figure 5:
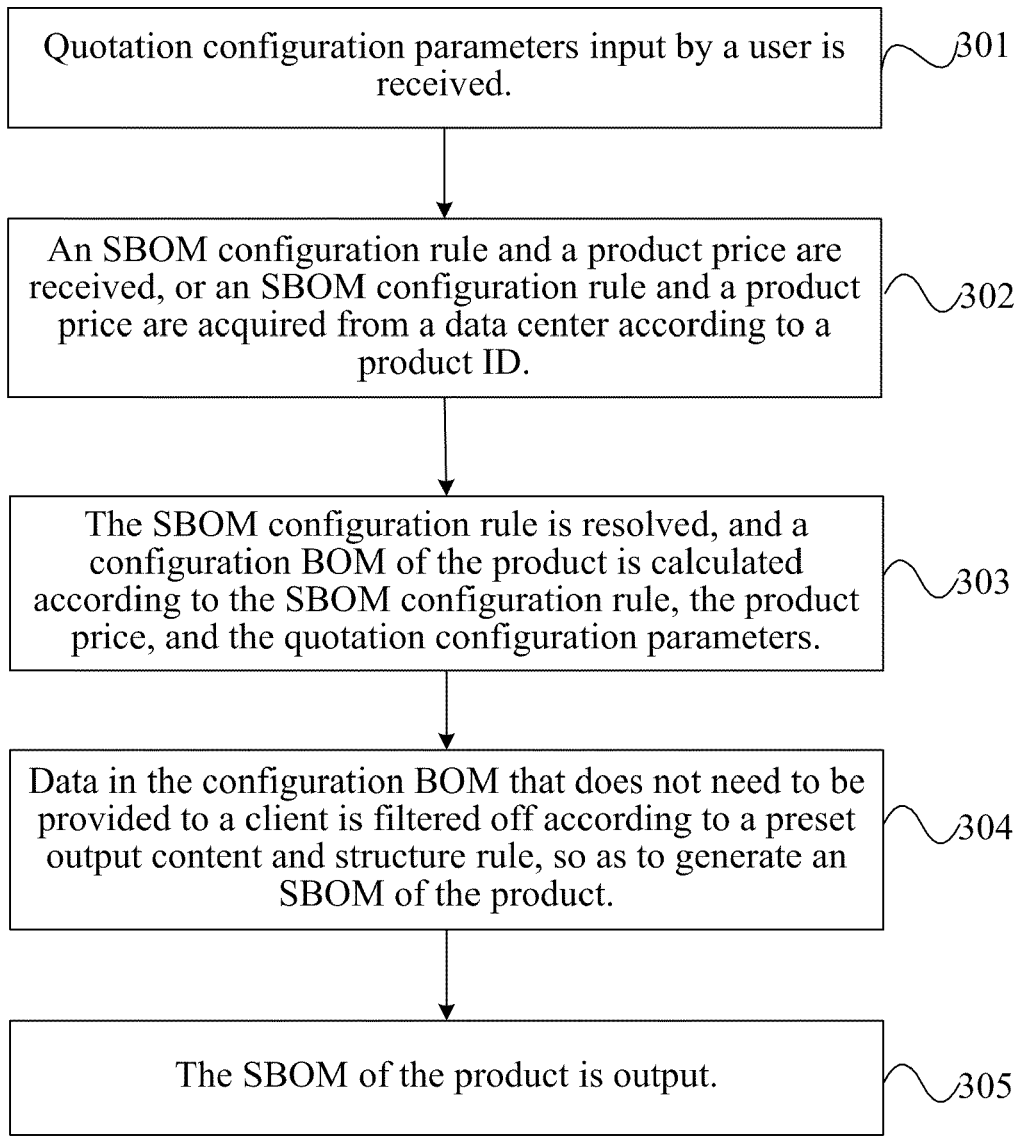
FIG. 5 is a flow chart of a process for generating and outputting an SBOM according to an embodiment of the present invention.

FIG. 5 is a flow chart of a process for generating and outputting an SBOM according to an embodiment of the present invention. Referring to FIG. 5, the process includes the following steps.

In Step 301, quotation configuration parameters input by a user is received.

In Step 302, an SBOM configuration rule and a product price are received, or an SBOM configuration rule and a product price are acquired from a data center according to a product ID.

In Step 303, the SBOM configuration rule is resolved, and a configuration BOM of the product is calculated according to the SBOM configuration rule, the product price, and the quotation configuration parameters.

In Step 304, data in the configuration BOM that does not need to be provided to a client is filtered off according to a preset output content and structure rule, so as to generate an SBOM of the product.

In Step 305, the SBOM of the product is output and provided to the client.

In this embodiment, the configuration BOM of the product is calculated according to the received or acquired SBOM configuration rule and the product price, and the calculated configuration BOM is automatically filtered according to the preset output content and structure rule to generate the client-oriented SBOM. As such, it is unnecessary to manually delete data such as a configuration instruction in the configuration BOM that does not need to be provided to the client. Compared with the conventional art, errors caused by manual deletion are avoided, thereby ensuring the accuracy of the SBOM, and improving the work efficiency.

In addition, the SBOM of the product may also be output to the data center according to the product ID of the product, stored at a storage position in the data center corresponding to the product ID, or further issued in the data center for subsequent use.

A project may include a plurality of products. For example, a short message system may include a short message center, a gateway, and other products. In an embodiment of the present invention, a corresponding relation between a project ID adapted to identify a project and product IDs of products included in the project, and a structural relation between the project and the products may be established. For example, a project X includes products X1, X2, and X3, the project ID is corresponding to the product IDs of the products X1, X2, and X3. The corresponding relation and the structural relation are stored in a data center, thereby associating the project with the products. Quotation for the project is achieved through cooperative quotation for a plurality of products of the project.

Figure 6:
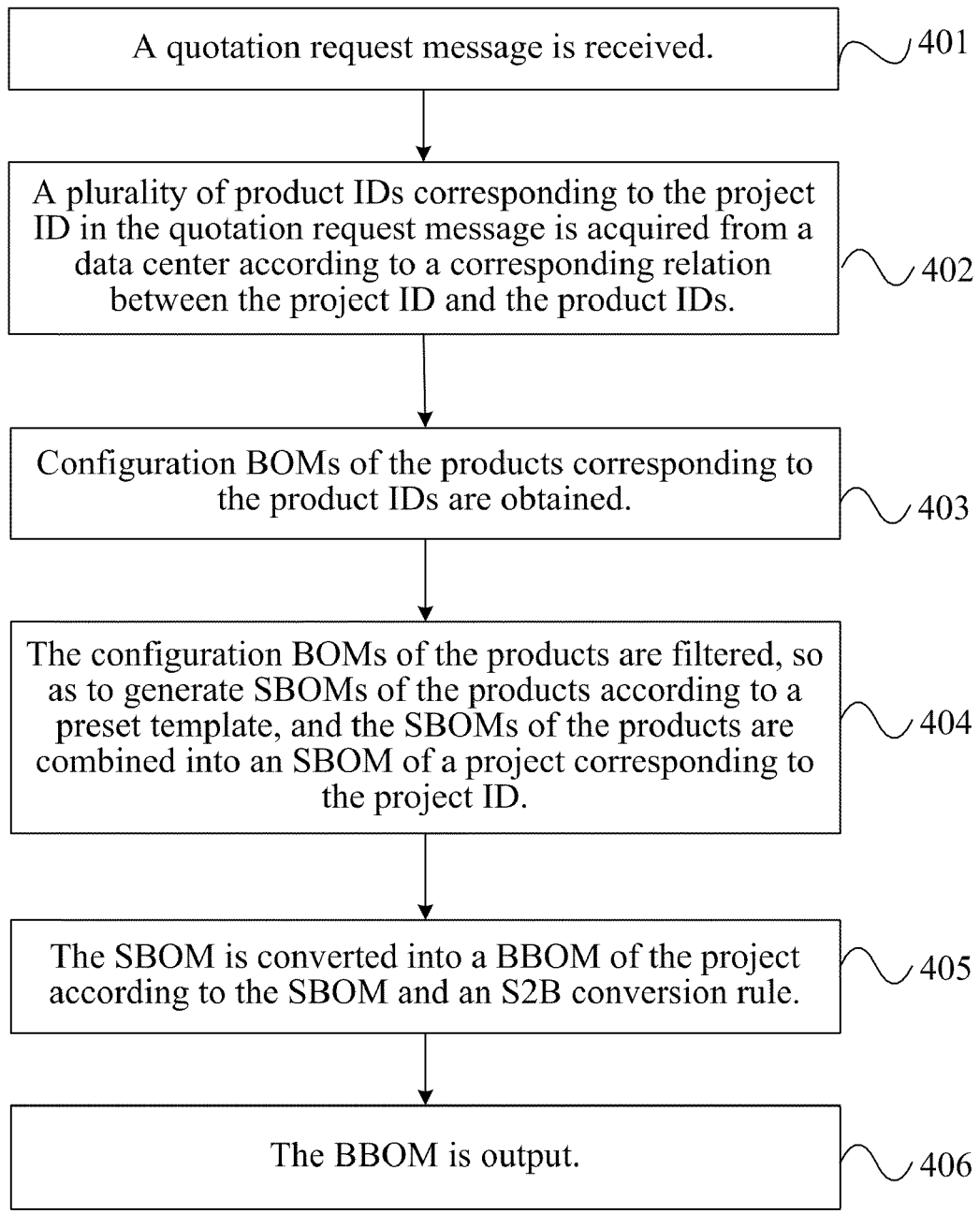
FIG. 6 is a flow chart of a configuration and quotation processing method according to another embodiment of the present invention.

FIG. 6 is a flow chart of a configuration and quotation processing method according to another embodiment of the present invention. Referring to FIG. 6, the method includes the following steps.

In Step 401, a quotation request message containing a project ID requesting quotation and quotation configuration parameters is received.

In Step 402, a plurality of product IDs corresponding to the project ID in the quotation request message is acquired from a data center according to a corresponding relation between the project ID and the product IDs.

In Step 403, configuration BOMs of the products corresponding to the product IDs are obtained.

The obtaining the configuration BOMs of the products corresponding to the product IDs specifically includes the following steps.

Firstly, SBOM configuration rules and product prices are received, or SBOM configuration rules and product prices are acquired from the data center according to the product IDs.

Then, the SBOM configuration rules are resolved, and configuration BOMs of the products are calculated according to the SBOM configuration rules, the product prices, and the quotation configuration parameters.

In Step 404, the configuration BOMs of the products are filtered according to a preset output content and structure rule, so as to generate SBOMs of the products according to a preset template, and the SBOMs of the products are combined into an SBOM of a project corresponding to the project ID.

In addition, in another embodiment, the configuration BOMs of the products are combined according to a preset template to generate a configuration BOM of the project corresponding to the project ID, the configuration BOM of the project is filtered according to a preset output content and structure rule to generate an SBOM of the project, and the SBOM of the project is then output and provided to a client.

In Step 405, the SBOM is converted into a BBOM of the project according to the SBOM and an S2B conversion rule.

In Step 406, the BBOM is output, and provided to an order processing system for use.

Specifically, the order processing system may be an enterprise resource planning (ERP) order processing system.

After the SBOM of the project is generated in the Step 404 and the BBOM of the project is obtained in the Step 405, the SBOM and the BBOM of the project may further be stored at a position in the data center corresponding to the project ID for subsequent use.

Through the above embodiment, the quotation task of a large project may be decomposed into quotation tasks of a plurality of products, cooperative quotation for the plurality of products at the same time is supported, and the BOMs of the products are automatically summarized into the SBOM and the BBOM of the project after the quotation tasks of the products are completed. For example, for a large project, one person is responsible for configuration and quotation of a product A in the project, another person is responsible for configuration and quotation of a product B of the project, and the BOMs of the product A and the product B are automatically summarized into a BOM of the project. Thereby, the processing efficiency of the project quotation process is improved.

Figure 7:
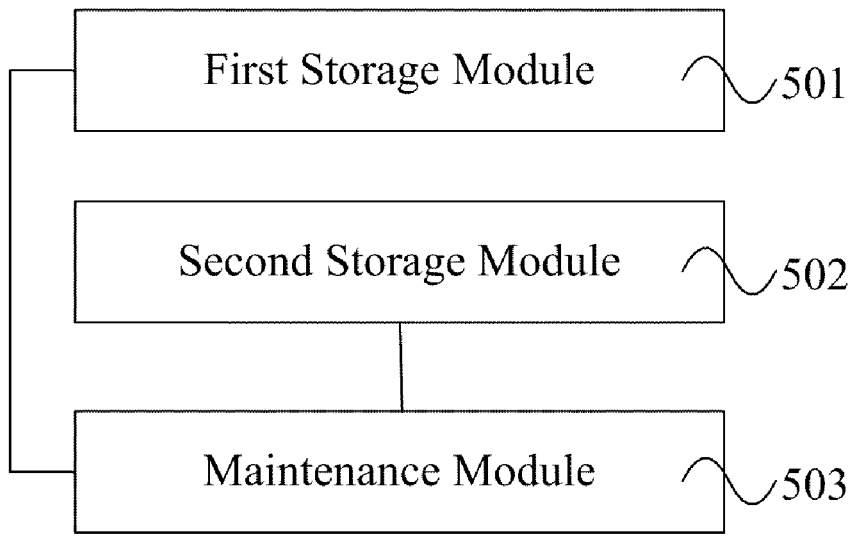
FIG. 7 is a schematic structural view of a data center according to an embodiment of the present invention.

FIG. 7 is a schematic structural view of a data center according to an embodiment of the present invention. Referring to FIG. 7, the data center in this embodiment includes a first storage module 501, a second storage module 502, and a maintenance module 503.

The first storage module 501 is adapted to store an SBOM configuration rule, a BBOM configuration rule, and an S2B conversion rule, and optionally a product price at a corresponding storage position according to a product ID. The second storage module 502 is adapted to store the product ID, and a maintainer ID and a corresponding password. The stored maintainer ID authorizes a corresponding maintainer to maintain and update the SBOM configuration rule, the BBOM configuration rule, and the S2B conversion rule corresponding to the product ID. The maintenance module 503 is adapted to receive a request message containing a maintainer ID and a password sent by a maintainer, authenticate the maintainer ID and the password in the request message according to the maintainer ID and the password stored in the second storage module 502, and authorize the maintainer to maintain and update the SBOM configuration rule, the BBOM configuration rule, and the S2B conversion rule stored in the first storage module 501 if the maintainer ID and the password in the request message pass the authentication. If the maintainer ID and the password in the request message fail to pass the authentication, the maintenance module 503 may generate and display an indication message indicating that the maintainer ID and the password fail to pass the authentication.

Figure 8:
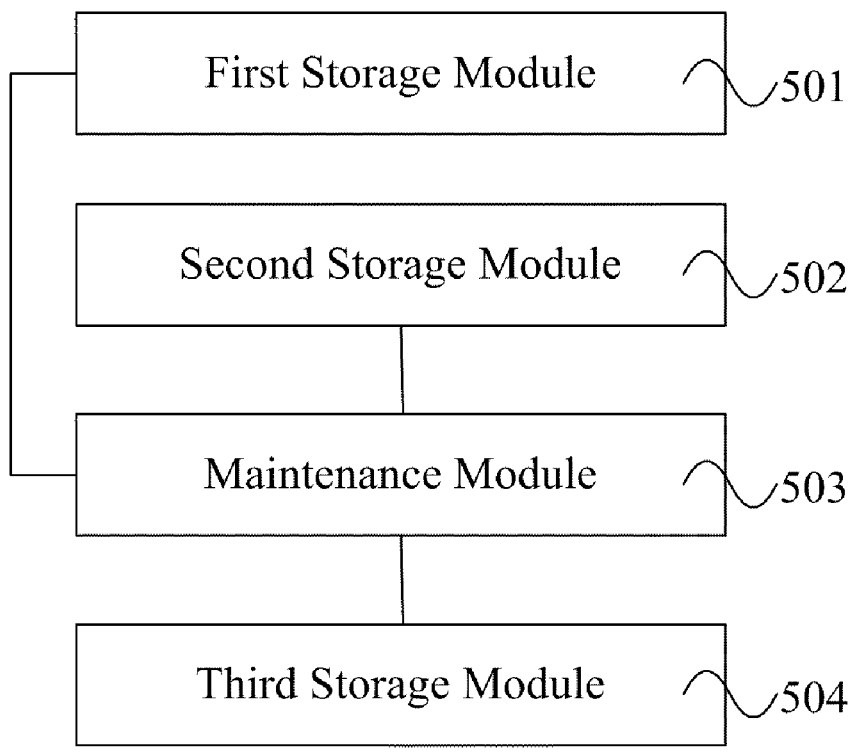
FIG. 8 is a schematic structural view of a data center according to another embodiment of the present invention.

FIG. 8 is a schematic structural view of a data center according to another embodiment of the present invention. Referring to FIG. 8, on the basis of the data center in the embodiment as shown in FIG. 7, the data center in this embodiment further includes a third storage module 504. The third storage module 504 is adapted to store a corresponding relation between a project ID of a project and product IDs of products included in the project, and a structural relation between the project and the products, and store an SBOM and a BBOM of the project at a corresponding storage position according to the project ID. If the maintainer ID and the password in the request message pass the authentication, the maintenance module 503 authorizes the maintainer to maintain and update the SBOM and the BBOM of the project in the third storage module 504.

The data center according to the above embodiment of the present invention can take a product as a unit to implement centralized storage, management, maintenance, and updating of the SBOM configuration rule, the BBOM configuration rule, the S2B conversion rule, and the product price of the product in accordance with the dynamic change of the product, such that the latest SBOM and BBOM can be generated according to the SBOM configuration rule, the BBOM configuration rule, and the S2B conversion rule in subsequent operations. Moreover, after the corresponding relation between the project ID and the product IDs of the products included in the project is stored, quotation for the project can be achieved through cooperative quotation for a plurality of products of the project, thereby improving the processing efficiency of the project quotation process.

Figure 9:
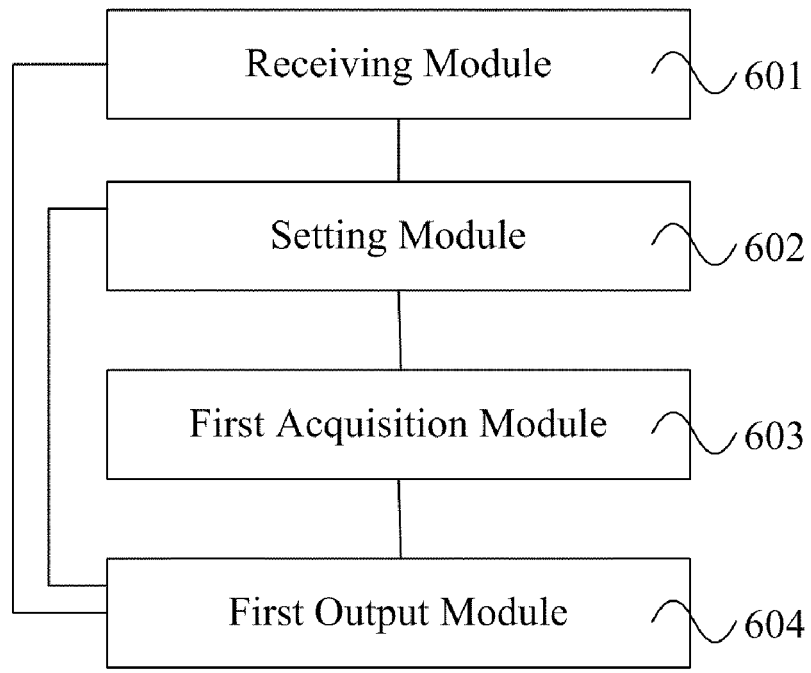
FIG. 9 is a schematic structural view of a data development device according to an embodiment of the present invention.

FIG. 9 is a schematic structural view of a data development device according to an embodiment of the present invention. Referring to FIG. 9, the data development device in this embodiment includes a receiving module 601, a setting module 602, a first acquisition module 603, and a first output module 604.

The receiving module 601 is adapted to receive a structure and configuration parameters of a product. Optionally, the receiving module 601 may further be adapted to receive a product price and send the product price to the first output module 604. The setting module 602 is adapted to set an SBOM configuration rule and a BBOM configuration rule of the product according to the structure and the configuration parameters of the product received by the receiving module 601. The first acquisition module 603 is adapted to acquire an S2B conversion rule according to the SBOM configuration rule and the BBOM configuration rule set by the setting module 602. The first output module 604 is adapted to output the SBOM configuration rule and the BBOM configuration rule set by the setting module 602, and the S2B conversion rule acquired by the first acquisition module 603. Specifically, the first output module 604 may directly output the SBOM configuration rule, the BBOM configuration rule, and the S2B conversion rule to a device for calculating an SBOM and a BBOM of the product, and may also output the SBOM configuration rule, the BBOM configuration rule, the S2B conversion rule, and the product price to a data center, store the SBOM configuration rule, the BBOM configuration rule, the S2B conversion rule, and the product price at a storage position in the data center corresponding to a product ID adapted to identify the product, or further issue the SBOM configuration rule, the BBOM configuration rule, and the S2B conversion rule for subsequent use.

Correspondingly, according to the embodiment as shown in FIG. 1, a configuration and quotation device may directly receive the SBOM configuration rule and the product price output by the first output module 604, or acquire the prestored SBOM configuration rule and product price from the data center according to the product ID. A configuration conversion device may also directly receive the S2B conversion rule output by the first output module 604, or acquire the prestored S2B conversion rule from the data center according to the product ID.

The data development device according to the above embodiment of the present invention can develop the SBOM configuration rule and the BBOM configuration rule of the product according to the structure and the configuration parameters of the product, and acquire the S2B conversion rule, such that an SBOM and a BBOM of the product can be automatically generated according to the SBOM configuration rule, the BBOM configuration rule, and the S2B conversion rule in subsequent operations.

Figure 10:
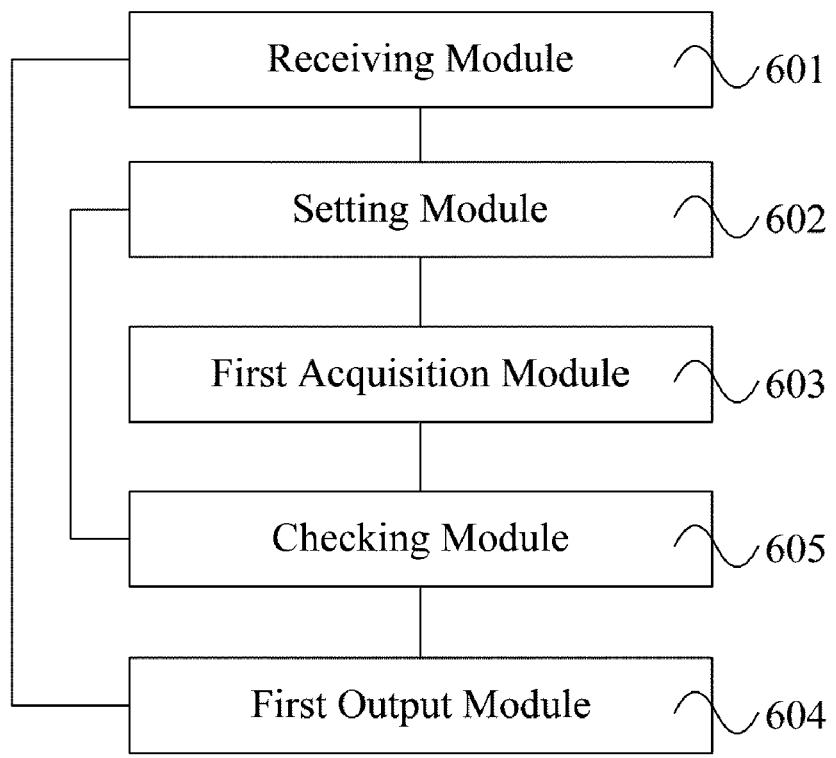
FIG. 10 is a schematic structural view of a data development device according to another embodiment of the present invention.

FIG. 10 is a schematic structural view of a data development device according to another embodiment of the present invention. Referring to FIG. 10, compared with the embodiment as shown in FIG. 9, the data development device in this embodiment further includes a checking module 605. The checking module 605 is adapted to check the SBOM configuration rule and the BBOM configuration rule set by the setting module 602, and the S2B conversion rule acquired by the first acquisition module 603 according to a preset parameter check and constraint rule; generate a check failure message if the SBOM configuration rule, the BBOM configuration rule, and the S2B conversion rule fail to pass the check, and return the check failure message to the setting module 602 and/or the first acquisition module 603 to instruct the setting module 602 and/or the first acquisition module 603 to adjust the SBOM configuration rule, the BBOM configuration rule, and/or the S2B conversion rule; and instruct the first output module 604 to output the SBOM configuration rule, the BBOM configuration rule, and the S2B conversion rule if the SBOM configuration rule, the BBOM configuration rule, and the S2B conversion rule pass the check.

Figure 11:
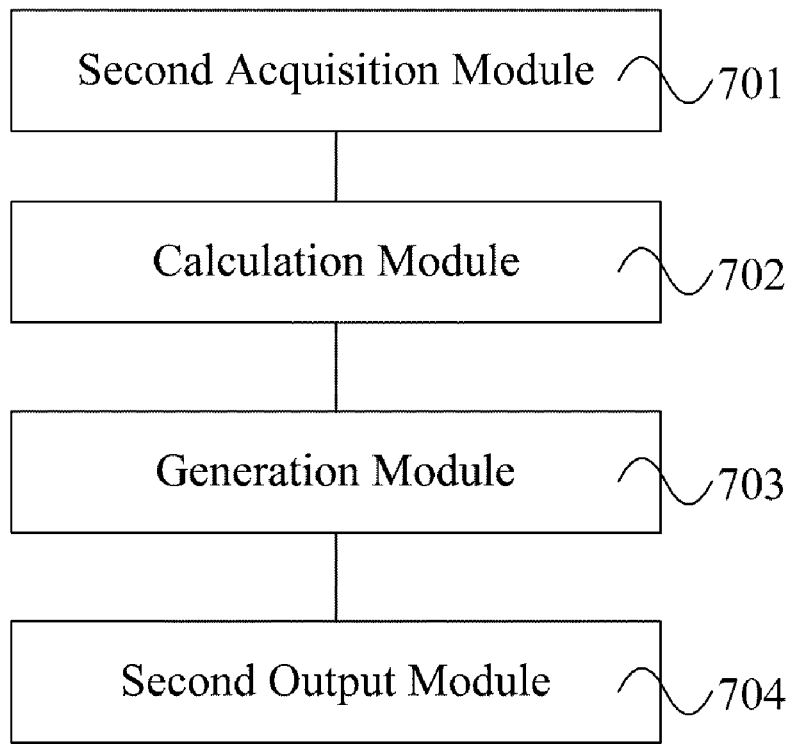
FIG. 11 is a schematic structural view of a configuration and quotation device according to an embodiment of the present invention.

FIG. 11 is a schematic structural view of a configuration and quotation device according to an embodiment of the present invention. Referring to FIG. 11, the configuration and quotation device in this embodiment includes a second acquisition module 701, a calculation module 702, a generation module 703, and a second output module 704.

The second acquisition module 701 is adapted to acquire an SBOM configuration rule and a product price of a product, and receive quotation configuration parameters input by a user. Specifically, the second acquisition module 701 may receive the SBOM configuration rule output by the first output module 604 in the data development device, and may also acquire the SBOM configuration rule of the product from a storage position in the first storage module 501 in the data center corresponding to the product ID. The calculation module 702 is adapted to calculate a configuration BOM of the product according to the SBOM configuration rule, the product price, and the quotation configuration parameters received or acquired by the second acquisition module 701. The generation module 703 is adapted to filter the configuration BOM calculated by the calculation module 702 according to a preset output content and structure rule to generate an SBOM of the product. The second output module 704 is adapted to output the SBOM generated by the generation module 703. Specifically, the second output module 704 may directly provide the SBOM to a client. Further, the second output module 704 may also output the SBOM of the product to the data center according to the product ID of the product, store the SBOM of the product at a storage position in the data center corresponding to the product ID, or further issue the SBOM of the product for subsequent use.

The configuration and quotation device according to the above embodiment of the present invention can calculate the configuration BOM of the product according to the SBOM configuration rule and the product price of the product as well as the received quotation configuration parameters, and automatically filter the calculated configuration BOM according to the preset output content and structure rule to generate the client-oriented SBOM. As such, it is unnecessary to manually delete data in the configuration BOM that does not need to be provided to the client. Therefore, errors caused by manual deletion are avoided, thereby ensuring the accuracy of the SBOM, and improving the work efficiency.

Further, in the configuration and quotation device according to the embodiment as shown in FIG. 11, the second acquisition module 701 may also receive a quotation request message containing a project ID requesting quotation and quotation configuration parameters, receive product prices and quotation configuration parameters of products included in a project identified by the project ID, and receive the SBOM configuration rules output by the first output module 604 in the data development device, or acquire the SBOM configuration rules of the products from the first storage module 501 in the data center according to product IDs. Correspondingly, the calculation module 702 calculates configuration BOMs of the products according to the SBOM configuration rules, the product prices, and the quotation configuration parameters of the products. The generation module 703 filters the configuration BOMs of the products according to a preset output content and structure rule, so as to generate SBOMs of the products according to a preset template, and combines the SBOMs of the products into an SBOM of the project corresponding to the project ID. Alternatively, the generation module 703 combines the configuration BOMs of the products according to a preset template to generate a configuration BOM of the project corresponding to the project ID, and filters the configuration BOM of the project according to a preset output content and structure rule to generate an SBOM of the project. The second output module 704 outputs the SBOM of the project.

Figure 12:
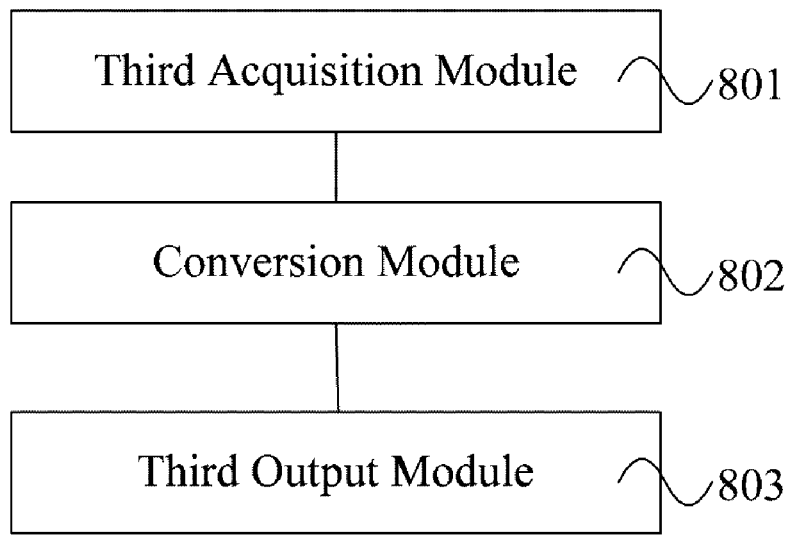
FIG. 12 is a schematic structural view of a configuration conversion device according to an embodiment of the present invention.

FIG. 12 is a schematic structural view of a configuration conversion device according to an embodiment of the present invention. Referring to FIG. 12, the configuration conversion device in this embodiment includes a third acquisition module 801, a conversion module 802, and a third output module 803.

The third acquisition module 801 is adapted to receive an SBOM of a product, and acquire an S2B conversion rule. Specifically, the third acquisition module 801 may receive the SBOM output by the second output module 704 in the configuration and quotation device, and receive the S2B conversion rule output by the first output module 604 in the data development device, or acquire the SBOM of the product and the S2B conversion rule from a corresponding storage position from the first storage module 501 in the data center according to a product ID. The conversion module 802 is adapted to convert the SBOM received by the third acquisition module 801 into a BBOM of the product according to the SBOM and the S2B conversion rule received or acquired by the third acquisition module 801. The third output module 803 is adapted to output the BBOM converted by the conversion module 802. Specifically, the third output module 803 may output the BBOM to an order processing system, or store the BBOM at a storage position in the data center corresponding to the product ID.

The configuration conversion device according to the above embodiment of the present invention can automatically convert the SBOM provided to the client into the BBOM of the product for production according to the S2B conversion rule. As such, the SBOM provided to the client does not need to be manually converted into the BBOM of the product. Therefore, errors caused by manual conversion are avoided, thereby ensuring the accuracy of the BBOM, and improving the work efficiency of the product configuration and quotation process.

Figure 13:
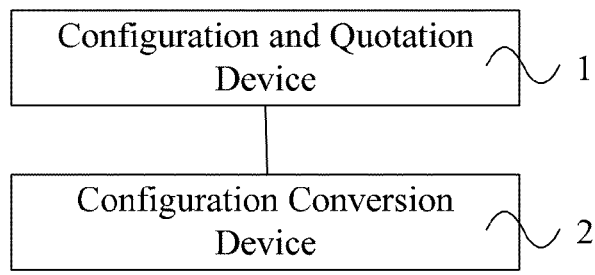
FIG. 13 is a schematic structural view of a configuration and quotation processing system according to an embodiment of the present invention.

FIG. 13 is a schematic structural view of a configuration and quotation processing system according to an embodiment of the present invention. Referring to FIG. 13, the configuration and quotation processing system in this embodiment is adapted to implement the processes according to the embodiments as shown in FIGS. 2 and 6. The configuration and quotation processing system includes a configuration and quotation device 1 and a configuration conversion device 2. The configuration and quotation device 1 is adapted to acquire an SBOM configuration rule and a product price of a product, and receive quotation configuration parameters; calculate a configuration BOM of the product according to the SBOM configuration rule, the product price, and the quotation configuration parameters; and filter the configuration BOM according to a preset output content and structure rule to generate an SBOM of the product, and output the SBOM. Specifically, the configuration and quotation device 1 may be the configuration and quotation device provided in the embodiment as shown in FIG. 11. The configuration conversion device 2 is adapted to convert the SBOM into a BBOM of the product according to the SBOM output by the configuration and quotation device 1 and an S2B conversion rule, and output the BBOM. Specifically, the configuration conversion device 2 may be the configuration conversion device provided in the embodiment as shown in FIG. 12.

Figure 14:
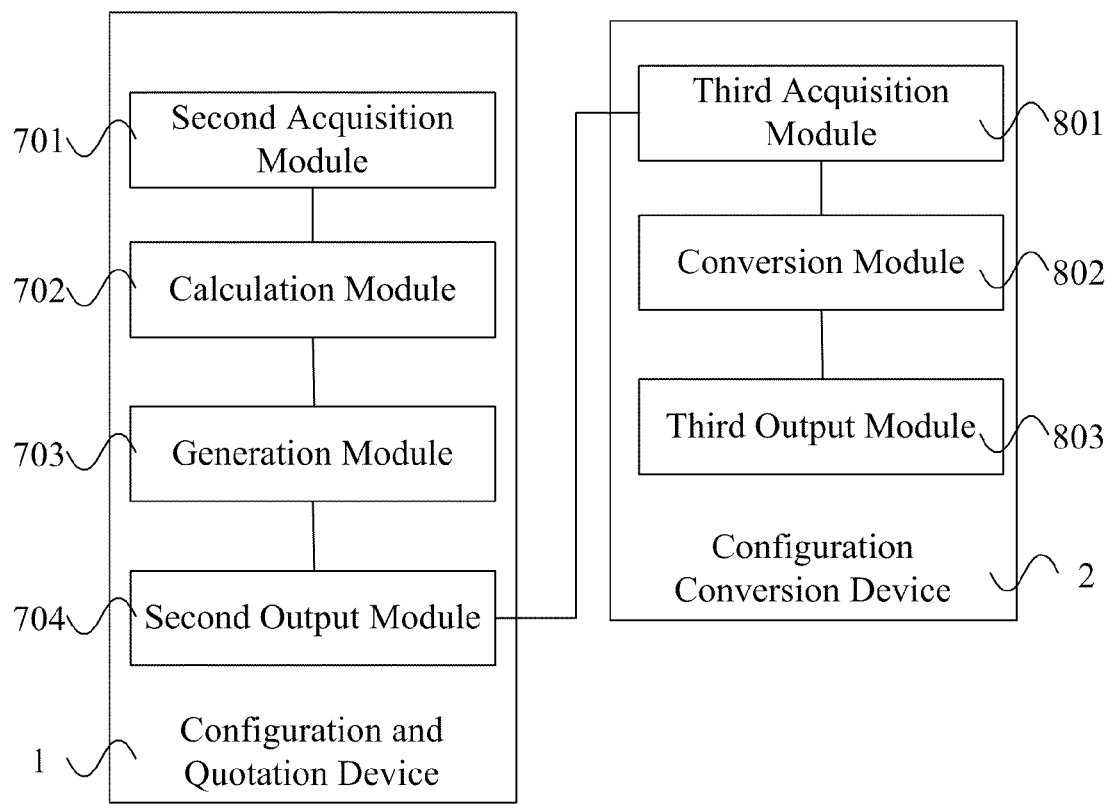
FIG. 14 is a schematic structural view of a configuration and quotation processing system according to another embodiment of the present invention.

FIG. 14 is a schematic structural view of a configuration and quotation processing system according to another embodiment of the present invention. Referring to FIG. 14, in this embodiment, the configuration and quotation device 1 is the configuration and quotation device provided in the embodiment as shown in FIG. 11, and the configuration conversion device 2 is the configuration conversion device provided in the embodiment as shown in FIG. 12. The configuration and quotation device 1 acquires an SBOM configuration rule and a product price of a product, and receives quotation configuration parameters input by a user; calculates a configuration BOM of the product; and filters the calculated configuration BOM according to a preset output content and structure rule to generate an SBOM of the product, and outputs the SBOM. The configuration conversion device 2 receives the SBOM of the product output by the configuration and quotation device 1, acquires an S2B conversion rule, and converts the received SBOM into a BBOM of the product according to the SBOM and the S2B conversion rule, and output the BBOM.

Figure 15:
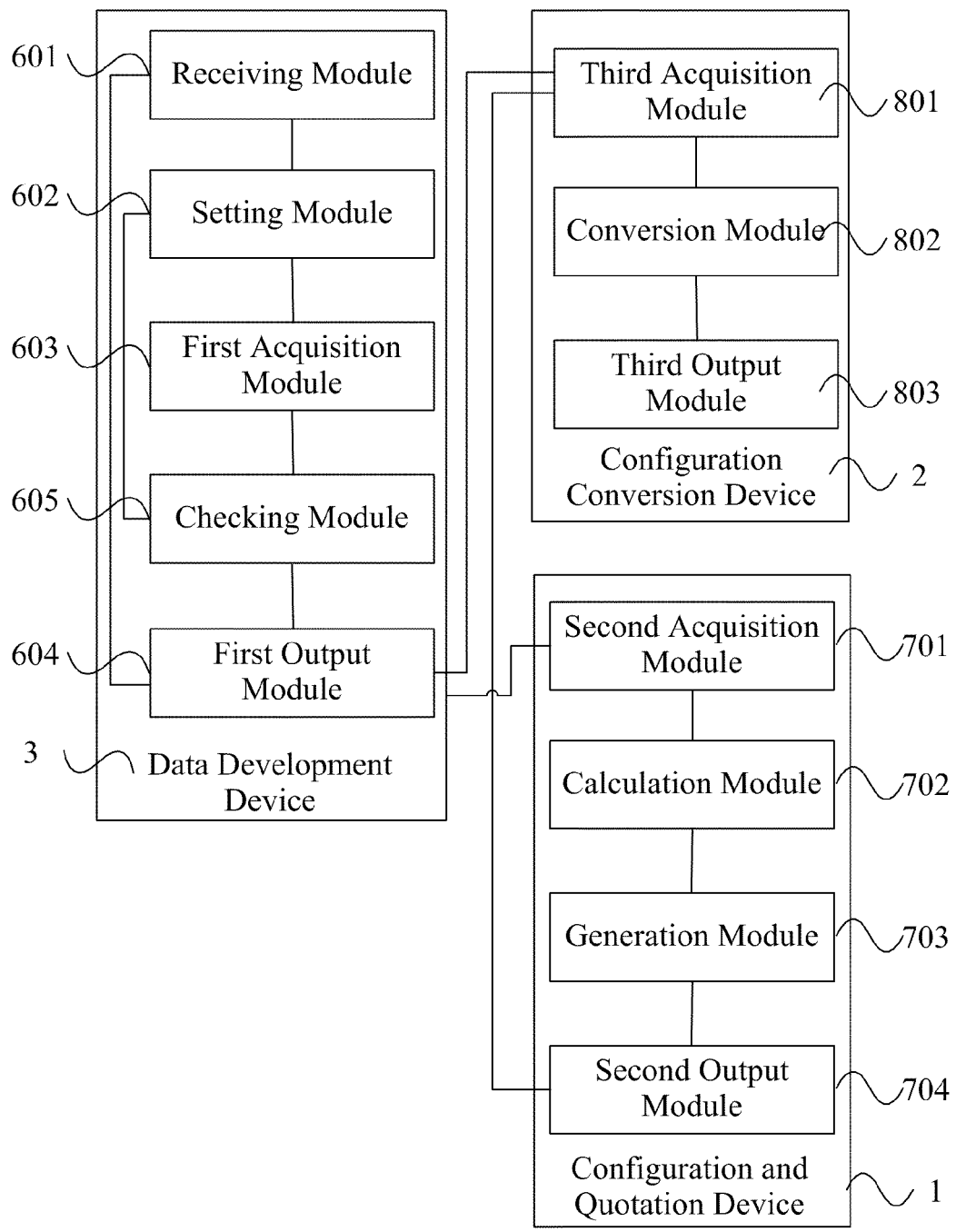
FIG. 15 is a schematic structural view of a configuration and quotation processing system according to another embodiment of the present invention.

FIG. 15 is a schematic structural view of a configuration and quotation processing system according to another embodiment of the present invention. Referring to FIG. 15, compared with the configuration and quotation processing system according to the embodiment as shown in FIG. 13, the configuration and quotation processing system in this embodiment further includes a data development device 3. The data development device 3 is adapted to set an SBOM configuration rule and a BBOM configuration rule of a product according to a structure and configuration parameters of the product, and acquire an S2B conversion rule according to the SBOM configuration rule and the BBOM configuration rule. In addition, the data development device 3 may further be adapted to receive a product price, and send the product price to the configuration and quotation device 1, or store the product price in a data center. Correspondingly, the configuration and quotation device 1 receives the SBOM configuration rule set by the data development device 3, and optionally, further receives the product price sent by the data development device 3 or acquires the product price stored by the data development device 3 from the data center. The configuration conversion device 2 receives the S2B conversion rule acquired by the data development device 3.

Specifically, the data development device 3 in this embodiment may be the data development device provided in the embodiment as shown in FIG. 9 or 10. The first output module 604 outputs an SBOM configuration rule and optionally a product price to the second acquisition module 701 in the configuration and quotation device 1, and outputs an S2B conversion rule to the third acquisition module 801 in the configuration conversion device 2.

Figure 16:
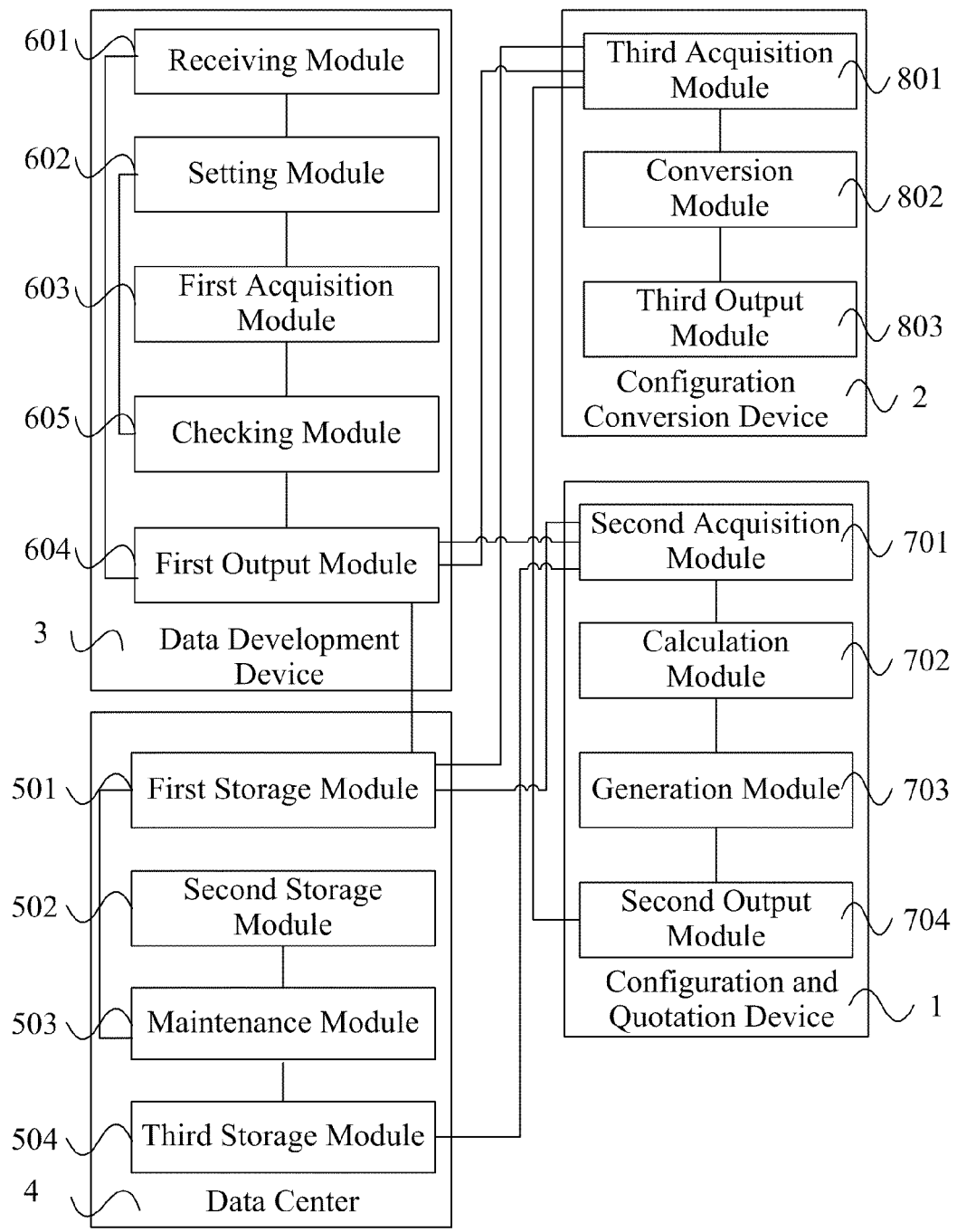
FIG. 16 is a schematic structural view of a configuration and quotation processing system according to still another embodiment of the present invention.

FIG. 16 is a schematic structural view of a configuration and quotation processing system according to another embodiment of the present invention. Referring to FIG. 16, compared with the configuration and quotation processing system according to the embodiment as shown in FIG. 12, the configuration and quotation processing system in this embodiment further includes a data center 4. The data center 4 is adapted to store an SBOM configuration rule and a BBOM configuration rule set by a data development device 3, an S2B conversion rule acquired by the data development device 3, a product price input by a user or sent by the data development device 3. Correspondingly, the second acquisition module 701 in the configuration and quotation device 1 acquires the SBOM configuration rule and the product price from the data center 4, and the third acquisition module 801 in the configuration conversion device 3 acquires the S2B conversion rule from the data center 4.

Specifically, the data center 4 in this embodiment may be the data center provided in the embodiment as shown in FIG. 7 or 8. The first output module 604 in the data development device 3 may output an SBOM configuration rule, a BBOM configuration rule, and an S2B conversion rule to the first storage module 501 in the data center 4, and may further output a product price to the first storage module 501 in the data center 4. The second output module 704 in the configuration and quotation device 1 may store an SBOM of a product at a storage position corresponding to a product ID in the first storage module 501 in the data center 4 according to the product ID, or store an SBOM of a project at a storage position corresponding to a project ID in the first storage module 501 in the data center 4 according to the project ID. The second acquisition module 701 in the configuration and quotation device 1 acquires a corresponding relation between a project ID in a quotation request message and product IDs of products included in the project, and a structural relation between the project and the products from the third storage module 504. The third output module 803 in the configuration conversion device 2 may store a BBOM of the product at a storage position corresponding to the product ID in the first storage module 501 in the data center 4 according to the product ID, or store a BBOM of the project at a storage position corresponding to the project ID in the first storage module 501 in the data center 4 according to the project ID.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a read-only memory (ROM), a random access memory (RAM), a magnetic disk, and an optical disk.

In the present invention, the calculated configuration BOM is automatically filtered to generate the client-oriented SBOM, and the SBOM provided to the client is automatically converted into the BBOM of the product according to the S2B conversion rule. As such, a user neither needs to manually delete data in the configuration BOM that does not need to be provided to the client, nor needs to manually convert the SBOM provided to the client into the BBOM of the product. Thereby, the accuracy of the SBOM and the BBOM is ensured, and the work efficiency of the product configuration and quotation process is improved.

The use of the open-source scripting language Python for expressing the SBOM configuration rule, the BBOM configuration rule, the S2B conversion rule, and the parameter check and constraint rule can support arithmetic and logical operations, and meet the requirement for expressing the configuration calculation and the parameter check and constraint rule by providing a variety of rule expressions.

The SBOM configuration rule, the BBOM configuration rule, and the S2B conversion rule can be automatically constrained and checked, and the accuracy of the rules can be ensured without any manual operation, thereby saving the human resources. Moreover, when the SBOM configuration rule, the BBOM configuration rule, and the S2B conversion rule fail to pass the check, corresponding adjustment is performed, thereby improving the accuracy of the SBOM configuration rule, the BBOM configuration rule, and the S2B conversion rule.

The SBOM configuration rule, the BBOM configuration rule, and the S2B conversion rule can be stored in the data center, so as to facilitate the corresponding maintainer to perform centralized management, maintenance, and updating on the SBOM configuration rule, the BBOM configuration rule, the S2B conversion rule, and the product price of the product, and meet the requirements of changes in the SBOM configuration rule and the BBOM configuration rule in accordance with the dynamic development of the product, thereby achieving effective sharing of the SBOM configuration rule, the BBOM configuration rule, the S2B conversion rule, and the product price of the product.

The quotation task of a large project may be decomposed into quotation tasks of a plurality of products, cooperative quotation for the plurality of products at the same time is supported, and the BOMs of the products are automatically summarized into the SBOM and the BBOM of the project after the quotation tasks of the products are completed, thereby improving the processing efficiency of the project quotation process.

The SBOM configuration rule, the BBOM configuration rule, and the S2B conversion rule of the present invention are universal. The present invention is not only applicable to various communication products, but the configuration and quotation method of the present invention can be used for configuration and quotation of a product, as long as components of the product can be expressed in the form of BOM, and calculation relations exist among the components of the product. For example, since in the automobile industry, an automobile is constituted by many parts, and the parts need to be configured according to a certain constraint relation, and in the pharmaceutical industry, a drug contains several ingredients, and the ingredients need to be mixed in a certain ratio, the SBOM configuration rule can be expressed and converted by using the solution of the present invention.

Finally, it should be noted that the above embodiments are merely provided for describing the technical solution of the present invention, but not intended to limit the present invention. It should be understood by persons of ordinary skill in the art that although the present invention has been described in detail with reference to the foregoing preferred embodiments, modifications or equivalent replacements can be made to the technical solution of the present invention, and such modifications or equivalent replacements do not depart from the spirit and scope of the technical solution of the present invention.

What is claimed is:

1. A method for configuration and quotation processing performed by a system for configuration and quotation processing comprising at least one processor, the method comprising:
   receiving a quotation request message containing a project identifier (ID) requesting quotation and quotation configuration parameters;
   acquiring a plurality of product IDs corresponding to the project ID in the quotation request message according to a corresponding relation between the project ID and the product IDs;
   for each product ID of the plurality of product IDs, acquiring a sales bill of material (SBOM) configuration rule of the product corresponding to each product ID respectively; calculating a configuration bill of material (BOM) of the product corresponding to each product ID respectively according to the SBOM configuration rule, a product price, and received quotation configuration parameters; filtering the configuration BOM of the product corresponding to each product ID respectively according to a preset output content and structure rule, so as to generate SBOM of the product corresponding to each product ID respectively according to a preset template;
   combining the SBOMs of the products corresponding to the product IDs into an SBOM of a project corresponding to the project ID; and
   converting the SBOM of the project into a base bill of material (BBOM) of the project according to an SBOM to BBOM (S2B) conversion rule.

2. The method of claim 1, further comprising:
   setting a BBOM configuration rule of the product according to a structure and configuration parameters of the product; and
   acquiring the S2B conversion rule according to the SBOM configuration rule and the BBOM configuration rule of the product;

wherein: the SBOM configuration rule of the product is set according to a structure and configuration parameters of the product.

3. The method of claim 1, further comprising:
setting a BBOM configuration rule of the product according to a structure and configuration parameters of the product; and
acquiring the S2B conversion rule and a product price from a data center according to a product ID;
wherein: the SBOM configuration rule of a product is acquired from the data center according to the product ID.

4. The method of claim 3, further comprising:
storing the product price, the SBOM configuration rule, the BBOM configuration rule, and the S2B conversion rule at a position of the data center corresponding to the product ID identifying the product.

5. The method of claim 2, further comprising:
checking the SBOM configuration rule, the BBOM configuration rule, and the S2B convention rule according to a preset parameter check and constraint rule after acquiring the SBOM configuration rule, setting the BBOM configuration rule, and acquiring the S2B conversion rule; and
adjusting the SBOM configuration rule, the BBOM configuration rule, and the S2B convention rule when not all of the SBOM configuration rule, the BBOM configuration rule, and the S2B conversion rule pass the check.

6. The method of claim 5, further comprising:
maintaining and updating the SBOM configuration rule, the BBOM configuration rule, and the acquired S2B conversion rule according to a preset distribution structure for maintaining the product information.

7. A method for configuration and quotation processing performed by a system for configuration and quotation processing comprising at least one processor, comprising:
receiving a quotation request message containing a project identifier (ID) requesting quotation and quotation configuration parameters;
acquiring a plurality of product IDs corresponding to the project ID in the quotation request message according to a corresponding relation between the project ID and the product IDs;
for each product ID of the plurality of product IDs, acquiring a sales bill of material (SBOM) configuration rule of the product corresponding to each product ID respectively, calculating, a configuration bill of material (BOM) of the product corresponding to each product ID respectively according to the SBOM configuration rule, a product price, and received quotation configuration parameters;
combining the configuration BOMs of the products corresponding to the product IDs according to a preset template to generate a configuration BOM of a project corresponding to the project ID;
filtering the configuration BOM of the project according to the preset output content and structure rule to generate an SBOM of the project; and
converting the SBOM of the project into a BBOM of the project according to the S2B conversion rule.

8. The method of claim 7, further comprising:
establishing and storing, a corresponding relation between the project ID adapted to identify a project and the product ID of a product in the project, and establishing and storing a structural relation between the project and the product; and storing the SBOM of the project and the BBOM of the project in the data center-corresponding to the project ID.

9. A system for configuration and quotation processing, the system comprising at least one processor which is configured to implement:
a configuration and quotation device, adapted to acquire an SBOM configuration rule and a product price of a product, and receive quotation configuration parameters; calculate a configuration BOM of the product according to the SBOM configuration rule, the product price, and the quotation configuration parameters; and filter the configuration BOM according to a preset output content and structure rule to generate an SBOM of the product; and
a configuration conversion device, adapted to convert the SBOM into a BBOM of the product according to an S2B conversion rule;
wherein the configuration and quotation device is further adapted to receive a quotation request message containing a project identifier (ID) requesting quotation and quotation configuration parameters; acquire a plurality of product IDs corresponding to the project ID in the quotation request message according to a corresponding relation between the project ID and the product IDs; for each product ID of the plurality of product IDs, acquire the SBOM configuration rule of the product corresponding to each product ID respectively, calculate the configuration BOM of the product corresponding to each product ID respectively according to the SBOM configuration rule, a product price, and received quotation configuration parameters; and filter the configuration BOM of the product corresponding to each product ID respectively according to the preset output content and structure rule, so as to generate SBOM of the product corresponding to each product ID respectively according to a preset template, and combine the SBOMs of the products corresponding to the product IDs into an SBOM of a project corresponding to the project ID; and
the configuration conversion device is further adapted to convert the SBOM of the project into a BBOM of the project according to the S2B conversion rule.

10. The system of claim 9, wherein the configuration and quotation device further comprises:
a second acquisition module, adapted to acquire the quotation configuration parameters, the SBOM configuration rule, and the product price output by a data development device;
a calculation module, adapted to calculate the configuration BOM of the product according to the SBOM configuration rule, the product price, and the quotation configuration parameters, wherein the SBOM configuration rule, the product price, and the quotation configuration parameters are all received or acquired by the second acquisition module;
a generation module, adapted to filter the configuration BOM calculated by the calculation module according to a preset output content and structure rule to generate an SBOM of the product;
a second output module, adapted to output the SBOM generated by the generation module;
the second acquisition module is further adapted to receive a quotation request message containing a project ID requesting quotation and quotation configuration parameters, receive product prices and quotation configuration parameters of products included in a project identified by the project ID, and acquire the SBOM configuration rules output by the data development device;

the calculation module is further adapted to calculate the configuration BOM of the products according to the SBOM configuration rule, the product prices, and the quotation configuration parameters of the products; and the generation module is further adapted to filter the configuration BOM of the products according to a preset output content and structure rule, generate SBOM of the products according to a preset template, and combine the SBOM of the products into an SBOM of the project corresponding to the project ID.

11. The system of claim 9, wherein: the configuration conversion device further comprise:

a third acquisition module, adapted to receive the SBOM of the product generated by the configuration and quotation device; acquire the S2B conversion rule;

a conversion module, adapted to convert the SBOM received by the third acquisition module into the BBOM of the product according to the SBOM and the S2B conversion rule received or acquired by the third acquisition module; and a third output module, adapted to output the BBOM converted by the conversion module.

12. The system of claim 9, further comprising:

the data development device, adapted to set the SBOM configuration rule and the BBOM configuration rule of the product according to the structure and configuration parameters of the product, acquire the S2B conversion rule according to the SBOM configuration rule and the BBOM configuration rule, and send the S2B conversion rule to the configuration conversion device.

13. The system of claim 12, further comprising:

a data center, adapted to store the SBOM configuration rule and the BBOM configuration rule set by the data development device, the S2B conversion rule and the product price; and the second acquisition module, adapted to receive the quotation configuration parameters, the SBOM configuration rule of the product, and the product price from a storage position in the data center corresponding to the product ID.

* * * * *